United States Patent [19]
McLaughlin

[11] Patent Number: 5,282,641
[45] Date of Patent: Feb. 1, 1994

[54] TRUCK/TRAILER CONTROL SYSTEM

[76] Inventor: Richard J. McLaughlin, 4203 W. 141st St., Hawthorne, Calif. 90250

[21] Appl. No.: 992,788

[22] Filed: Dec. 18, 1992

[51] Int. Cl.⁵ .............................................. B62D 13/00
[52] U.S. Cl. .................................... 280/432; 180/165; 188/112 A; 280/400; 280/426; 280/442; 280/DIG. 9; 280/DIG. 14
[58] Field of Search ............... 280/432, 400, 426, 442, 280/DIG. 9, DIG. 14; 180/165; 188/161, 162, 164, 112 A; 303/7

[56] References Cited

U.S. PATENT DOCUMENTS

| | | | |
|---|---|---|---|
| 3,564,311 | 2/1971 | Beyerdroe | 310/93 |
| 3,834,480 | 9/1974 | McGee | 180/135 |
| 4,463,966 | 8/1984 | Studdard | 280/442 |
| 4,824,135 | 4/1989 | McGregor | 280/442 |
| 4,955,630 | 9/1990 | Ogren | 280/419 |
| 5,023,499 | 6/1991 | Kuwahara | 310/105 |
| 5,054,587 | 10/1991 | Matsui | 188/267 |

Primary Examiner—Mitchell J. Hill
Attorney, Agent, or Firm—Charles H. Thomas

[57] ABSTRACT

Automatic Trailer Control System—containing four principle inventions. One part of the invention provides automatic trailer steering control to the trailer to cause a delayed turn of the trailer steering mechanism while maneuvering a turn. A second part of the invention provides an electro-magnetic braking system, to the trailer, which is controlled by the same Microcomputer system that controls the trailer turning. The third part of the invention utilizes the electro-magnetic braking system as an alternator/generator to be used as an auxiliary battery charging system. A fourth part of the invention uses the electro-magnetic braking system as a motor to drive the trailer wheels as an assist during trucking operations. All operational functions are controlled by the Microcontroller based control system mounted on the trailer rear wheel platform. Sensors are placed on the truck/trailer operating system to obtain operational information needed for the control of the system.

16 Claims, 8 Drawing Sheets

TRUCK/TRAILER CONTROL SYSTEM

BACKGROUND OF THE INVENTION

1. Field of the Invention

This invention provides a total system implementation of multiple products. These products are designed to be integrated into this closed loop control system and each product is configured to provide multiple functions while operating in the system configuration. The only relationship to previous concepts is the basic physics of the functions being applied. By using these basic concepts and expanding the products for multiple functions this invention provides a total system application dearly needed by the whole world.

This invention provides a basic control electronics system which incorporates all aspects of control and safety of operation to the Truck/Trailer system. The Microcontroller electronics provides the intelligence as the heart of the system and the link to the power driving elements in the system. This concept is equally applicable to automobiles, pickups, or any vehicle.

The first feature and primary issue for this invention is to provide an Automatic control to the Truck/Trailer during all operational maneuvers. During a simple operation of maneuvering a Truck/Trailer around a corner, the operator must negotiate the turn by providing a wide margin to clear the corner. With this system, the Control System will delay the turning of the Trailer by continuing in the forward direction until the turn can be made without interference. During this operation the platform will be rotating in the opposite direction of the turn to maintain a forward movement. After a calculated travel distance, based upon detected trailer wheel speed from the Electro-Magnetic motor 15 and the truck speedometer pickoff 26, the system determines when the trailer can be safely turned, then the system will rotate the trailer platform or wheel assemblies to make the turn as did the truck. During this turn the motor drive electronics are engaged to accelerate the trailer in the forward direction to eliminate side drag from the truck. The Truck can then make this turn without having to negotiate for clearance and simply turn as it would without a trailer attached. This technique will prevent mishaps from occurring during these simple maneuvers and provide the operator with a much greater level of safety. At times the failure to properly negotiate a turn has caused severe damage to the vehicle or other property and in some cases injury to other persons in their own vehicles.

A second feature is the Electro-Magnetic Braking System. This subsystem is also controlled by the Microcontroller and provides a pulse-width drive control to the Electro-Magnetic trailer braking system. This feature will provide the operator with a significant margin of safety during normal operations. The control will provide braking to the Trailer in a manner which will safely bring the vehicle to a stop, and will do so in such a manner as to keep the wheels from locking-up. The "H" bridge Power Field Effect Transistor (FET) driver output from the Power Drive Assembly provides the source of drive power which is transmitted to the Electro-Magnetic assembly. This power drive can be applied as a shunt (short) across the magnetic windings or by reversing the polarity of the drive and providing a reverse drive to the motor (same drive approach as when backing-up). The optimum, and most sure method, is to reverse the polarity of the drive. The reverse drive effect will transfer the load from the magnetic drive assembly 25 to the rotor 24 in the assembly. This creates a loading effect on the wheel rotor and a braking effect on the assembly. To minimize the heating effects from this load, the application of the reverse drive to the magnetics is applied by using the Pulse-Width output drivers. In conjunction with the reverse drive, the Electro-Magnetic Assembly will contain heatsink fins to dissipate heat generated during the braking operation. The application of the pulses are controlled to maintain maximum braking effectivity and avoid locking-up the brakes. The application of this system will significantly reduce major problems the operators experience from trailers jackknifing and causing major tie-ups on the roads and freeways.

In addition to the braking feature a third feature is made available, the Electro-Magnetic brakes can also be used as a power source for generating power to recharge the trailer control system battery. When the Electro-Magnetic braking assembly is not in use as a brake it is reconfigured electronically as a generator which provides a power source for recharging the system battery. This is the same approach that is presently used in the alternators installed in all vehicles. The voltage regulation is controlled by an electronic module built into the alternator.

As a fourth feature, the Electro-Magnetic braking assembly can also be reconfigured as a motor which provides additional driving power to the truck when transitioning uphill or as an aid during normal operations. The primary aid from the motor will occur during uphill transitions where the motor assist will enable the truck to overcome the significant overloading effects from uphill transitions. The power output drivers contain an "H" bridge drive FET output, which is controlled by the Microcontroller, to provide the Pulse-Width drive to the Electro-Magnetic assembly to drive it as a motor. The drive power to the wheels is determined by the width of the power driven pulse to the motor. As the Pulse-Width increases, the power is increased to the motor.

2. Description of the Prior Art

The concept of this design is unique in that a total system concept is conceived as a combination of multiple products. These products are reconfigured to merge into the system as a total closed loop control system. The closest products known relating to this system are reflected in the following patents.

| PATENT NO. | INVENTOR |
|---|---|
| 5,054,587 | Norio Matsui |
| 5,023,499 | Touro Kuwahara |
| 4,955,630 | Axel Ogren |
| 4,824,135 | Donald McGregor |
| 4,463,966 | Ronald Stoddard |
| 3,834,480 | Leland McGee |
| 3,564,311 | Hartwig Beyersdorf |

These patents disclose similar features to the stated invention.

SUMMARY OF THE INVENTION

This invention is a total control system concept which provides a significant improvement to the safety and operation of trucks while towing trailers. The advantages gained by using this system are:

1. Greater safety on the road and in the dense city areas.
2. Increased operational efficiency.
3. Potential energy savings on the open road.
4. Lower operating costs.
5. Potential reduction in insurance costs.
6. Fewer restricted access areas, opening up more areas for business.
7. Reduced stress for operators.
8. Lower maintenance requirements.
9. Reduced down time.
10. Higher profits or more competitive pricing.
11. Significant decrease in minor damage to vehicles.

The primary device controlling the system is the Microcontroller. Eight-Bit or Sixteen-Bit Microcontrollers, such as the 8048, 8748, 8049, 8749, 8051, 8751 Eight-Bit or a 8096, 8796 Sixteen-Bit Microcontroller will be the type of device used for this application. Several manufacturers have these devices readily available, such as Fujitsu, Intel, Intersil, National, NEC, Signetics and Toshiba. These devices contain internal memory, timers, A/D conversion and can access external memory as needed. For multiple analog inputs the A/D inputs to the Microcontroller will be multiplexed through FET analog gates such as the DG400 series. External logic will be kept to a minimum to minimize the cost and make the total system reasonably priced. This Microcontroller is the heart of the system and contains all the control capability required for operation. Software programs developed provide routines which monitor all systems continually and respond to every system operation within microseconds. The software is programmed into the Microcontroller EPROM memory during development and into ROM version Microcontrollers for production. The software will be programmed using a combination of C language and Assembly languages which will be compiled and programmed into the Microcontroller temporary reprogrammable EPROM memory. The program will be determined by the using standard trucking operations now conducted by operators. After the software programs have been debugged and proven from several successful test operations, the final program will be programmed into permanent ROM memory for production units. This development program will require approximately three years to allow for as many possible variables as possible and to confirm the safety of operation prior to allowing the vehicles to drive on the public highways. Sensors are placed throughout the Truck/Trailer operating systems which provide information to the central control unit. Typical sensors for this application are Temperature, Pressure, Tilt, Engine RPM, Truck Speed and Position. Temperature sensors, such as the LM134, LM135, LM234, LM235, LM334, LM335, made by National, or the REF-02, REF-05 series made by PMI, would be the typical type used for this application. These are all self contained temperature transducers which will minimize the requirement for peripheral devices. Pressure Transducers, such as those manufactured by Data Instruments Inc., Entran Devices, Micro Switch (a division of Honeywell), Texmate, Bourns, Daytronic, as well as many others, will be used to sense air (Pneumatic) and/or Hydraulic pressures. Simple tilt sensors, similar as those used in automobile and truck alarm systems, will provide a signal when the trailer is tilted to far during a turn. These devices are presently used in vehicles for Anti-Theft systems. Position sensing will be accomplished by using either ceramic metal film, metal film, or plastic film potentiometers. These are very reliable, environmentally sealed and long life devices which provide infinite resolution and very rugged for the high vibrational operation like this. These devices are made by Bourns, IET Labs, Vernitron, Vishay, Dale Electronics, Litton, as well as many others. Wheel rotation, or wheel speed, will be sensed by using the Electro-Magnetic assembly rotational information. In conjunction with wheel speed, the standard magnetic rotational pickoff as used for tachometers will be used to sense the rotation of the speedometer cable at the connection to the transmission. The pickoff will provide one pulse per revolution of the cable which will be converted into truck speed displayed on the speedometer to the operator. The conversion ratio for the cable rotation to truck speed is provided by the truck manufacturer and will be used in conjunction with the trailer wheel speed for all maneuvers. Anther position sensor is the Doppler Transceivers to detect the position of nearby objects from the rear of the trailer and in the forward position for overhead clearances. This device is available from several manufacturers including; Motorola, Rockwell, Versatron Corp., Lear Siegler, General Electric, and Shokai Far East Ltd. and a version of these devices will be used in the system.

Information sensed includes;
1. Truck front wheel angular position movement.
2. Hydraulic/pneumatic pressures.
3. Trailer wheel rotation/speed.
4. Trailer length and number of wheels.
5. Trailer-to-Truck angular position.
6. Trailer battery status.
7. Truck engine temperature.
8. Truck transmission operational status.
9. Truck/Trailer level ride status (Tilt).
10. Trailer Key Code Information.
11. Trailer to Platform Angular position.
12. Truck speedometer pickoff.
13. Truck engine RPM.

Using this information the system control becomes automatic and requires no operator intervention. Safety features have been designed into the system to ensure safety of operation.

The control system is a dual redundant system (two identical units) each of which operates independently and each capable of total control of all operations. These units are mounted side-by-side in the control electronics assembly. In addition to this feature the system has a mechanical override which will lock the Trailer steering mechanism into a fixed forward position for standard operation. Emergency mechanical brakes are also included to allow the system to be parked and locked when not in use. These mechanical brakes can also be used in the unlikely event of failure of both operational systems. A control panel is mounted in the cab of the Truck where the operator can engage or disengage the trailer electronic controlled steering system as desired. The Electro-Magnetic braking system will remain in operation to provide the safety and economic features of the system.

The invention may be described with greater clarity and particularity with reference to the accompanying drawings.

DESCRIPTION OF THE DRAWINGS

Referring to the accompanying drawings, which are for illustrative purposes only.

DESCRIPTION OF THE EMBODIMENT

Figure 1:
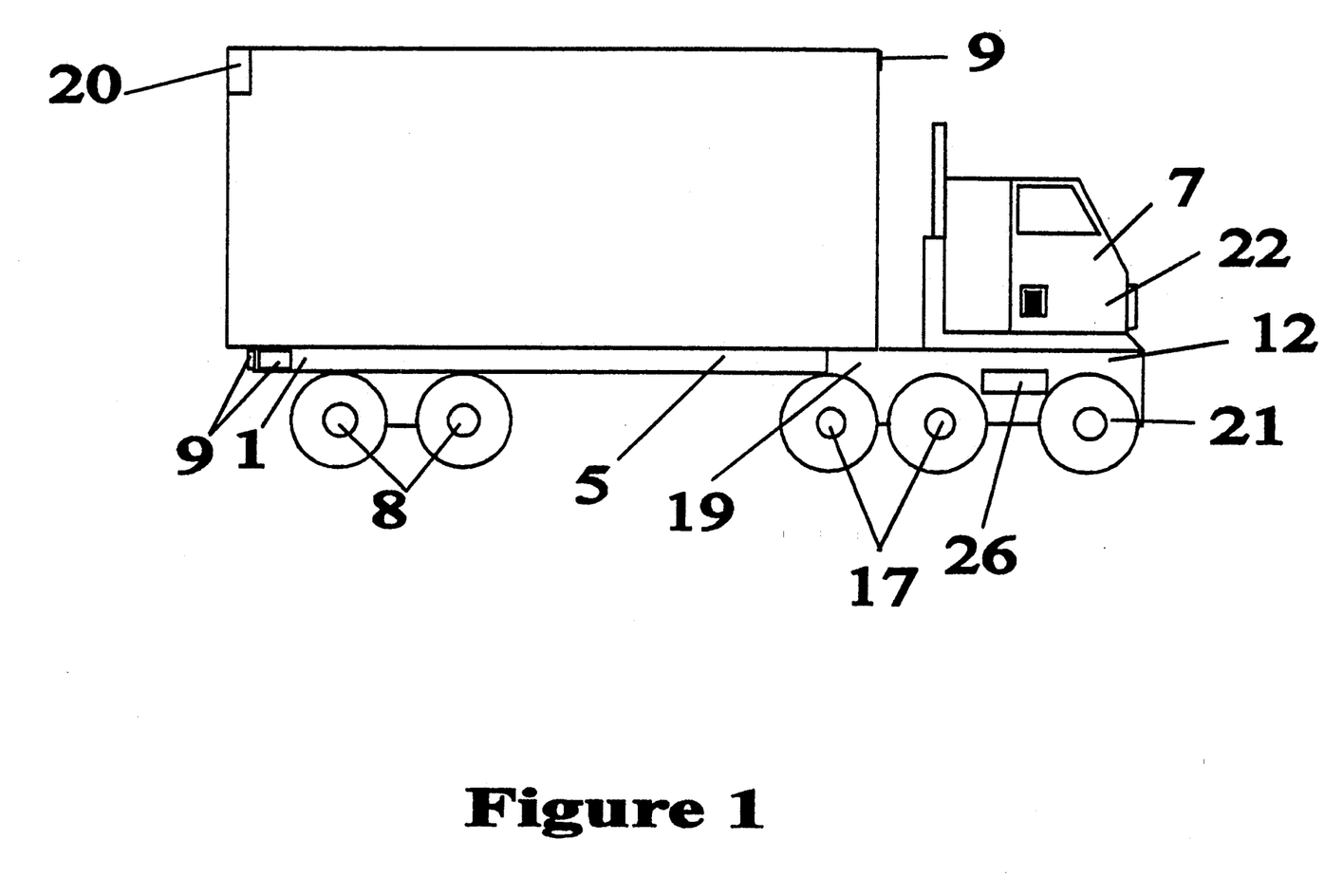
FIG. 1 illustrates the system configuration and location of functional elements of the system.
Figure 2:
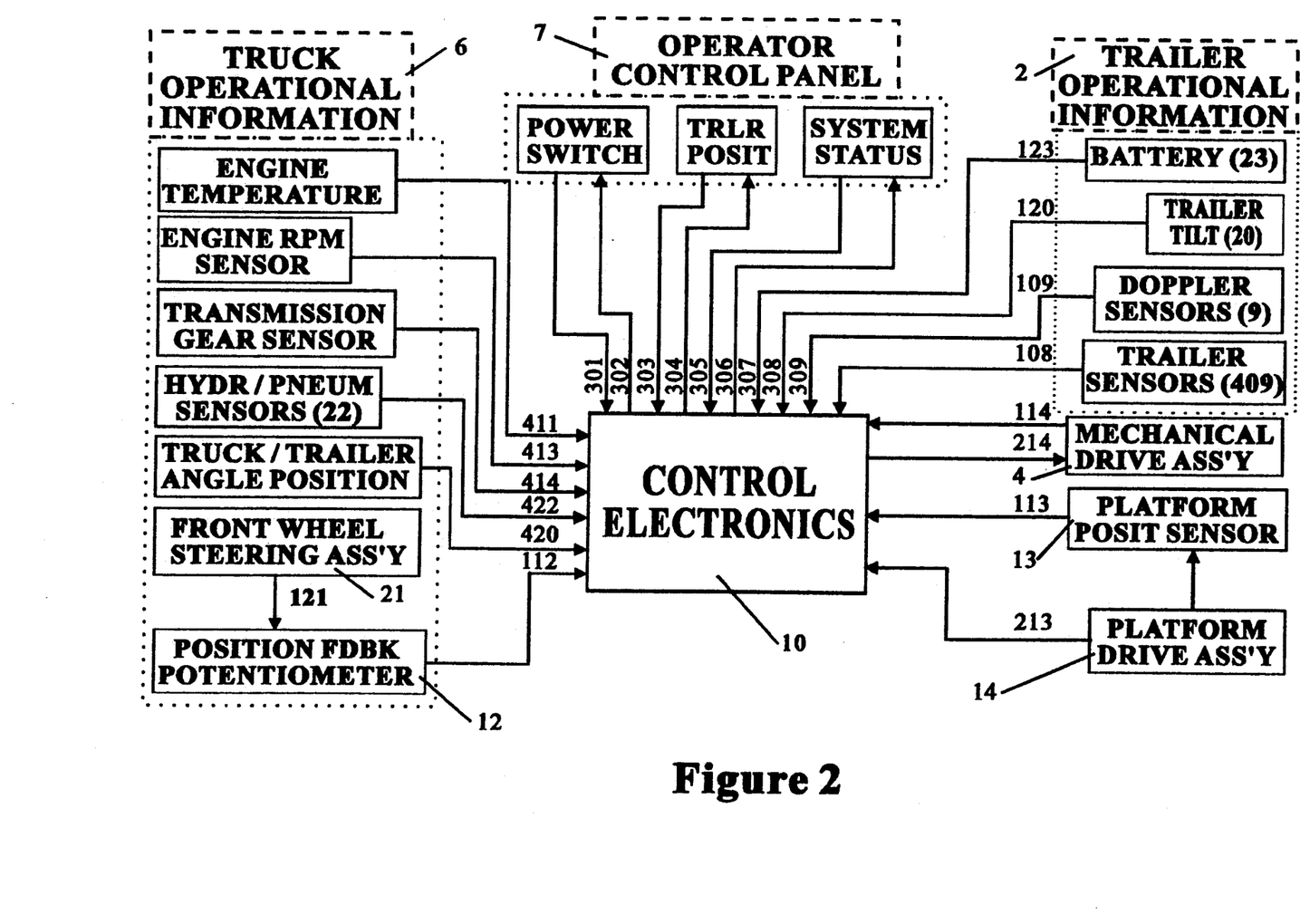
FIG. 2 is a block diagram of the Truck/Trailer control system illustrating functional features and principle functional components.
Figure 3:
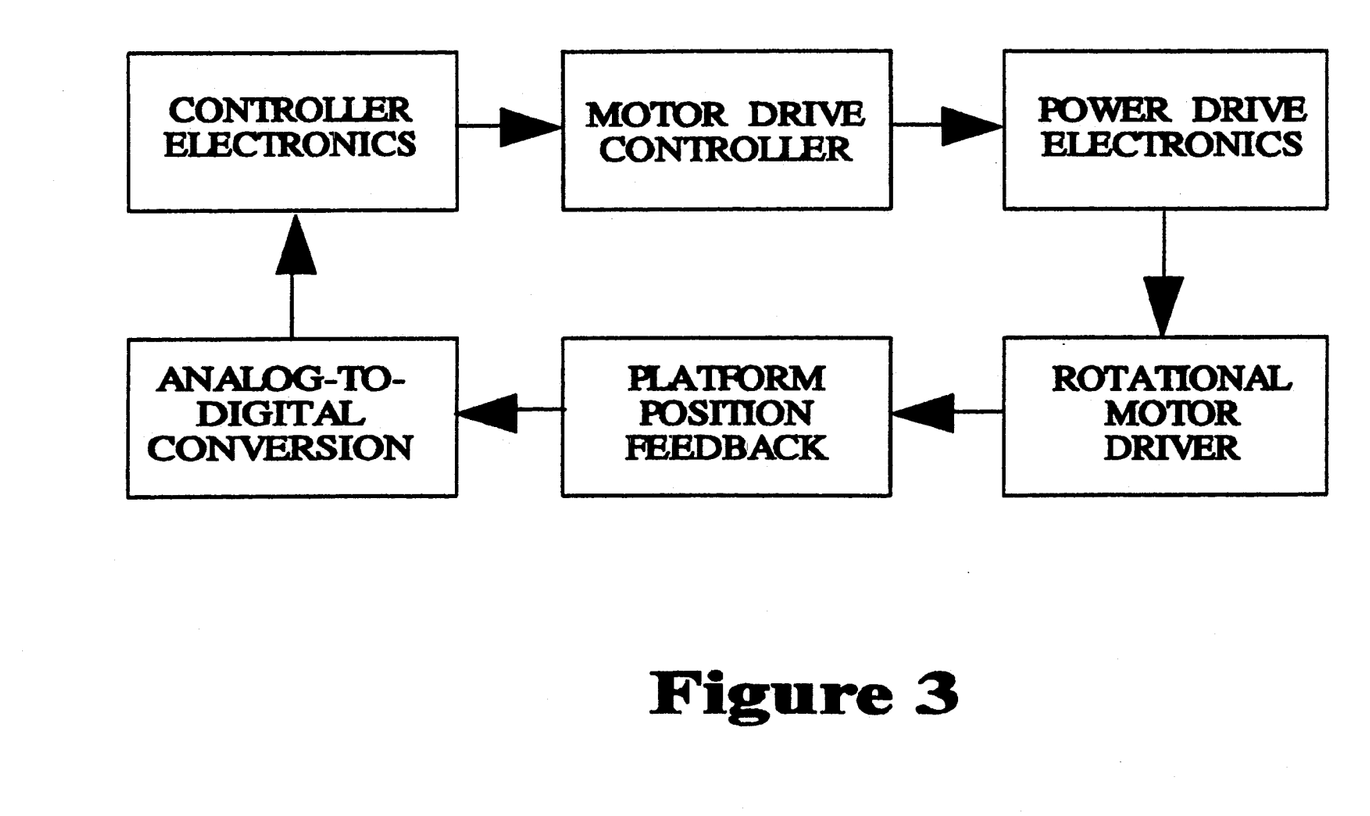
FIG. 3 illustrates the Trailer steering mechanism in a control loop block diagram.
Figure 4:
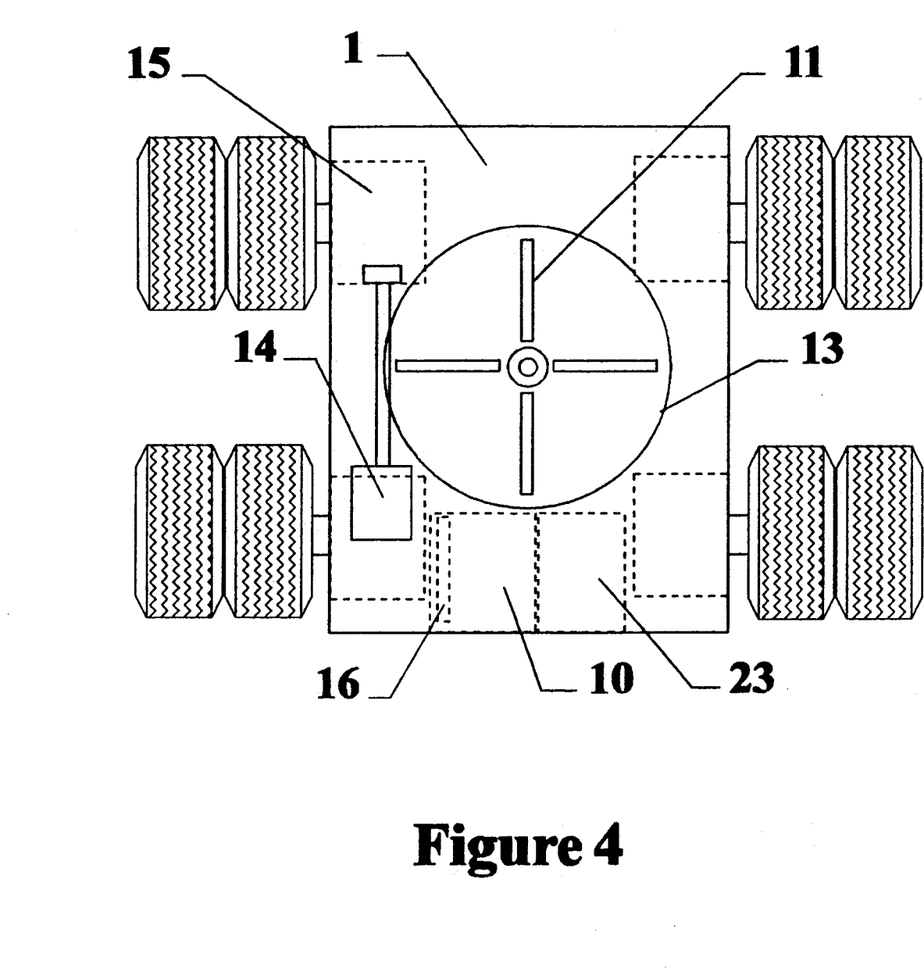
FIG. 4 is a view of the Trailer steering platform mechanism.
Figure 5:
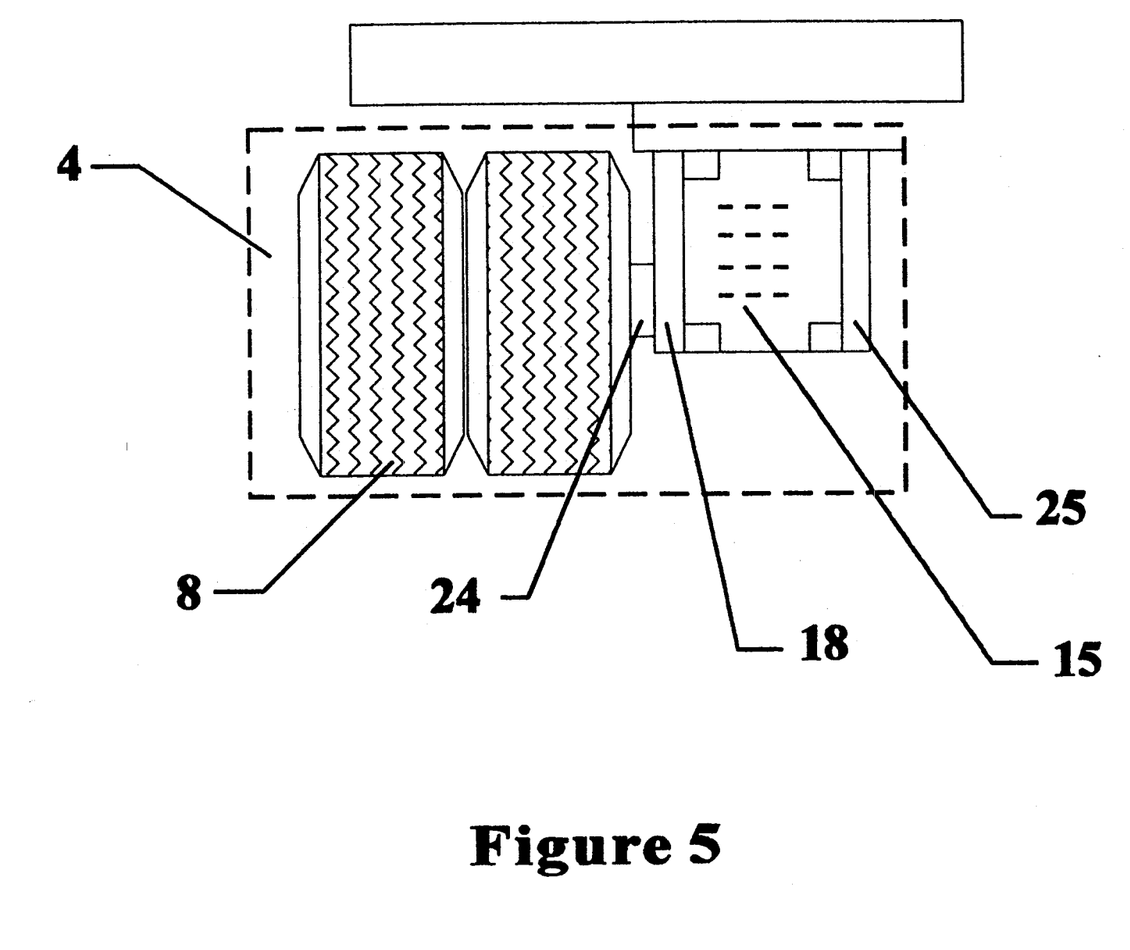
FIG. 5 is a view of the Electro-Magnetic Motor/-Drive Brake Assembly as mounted on the Trailer.
Figure 6:
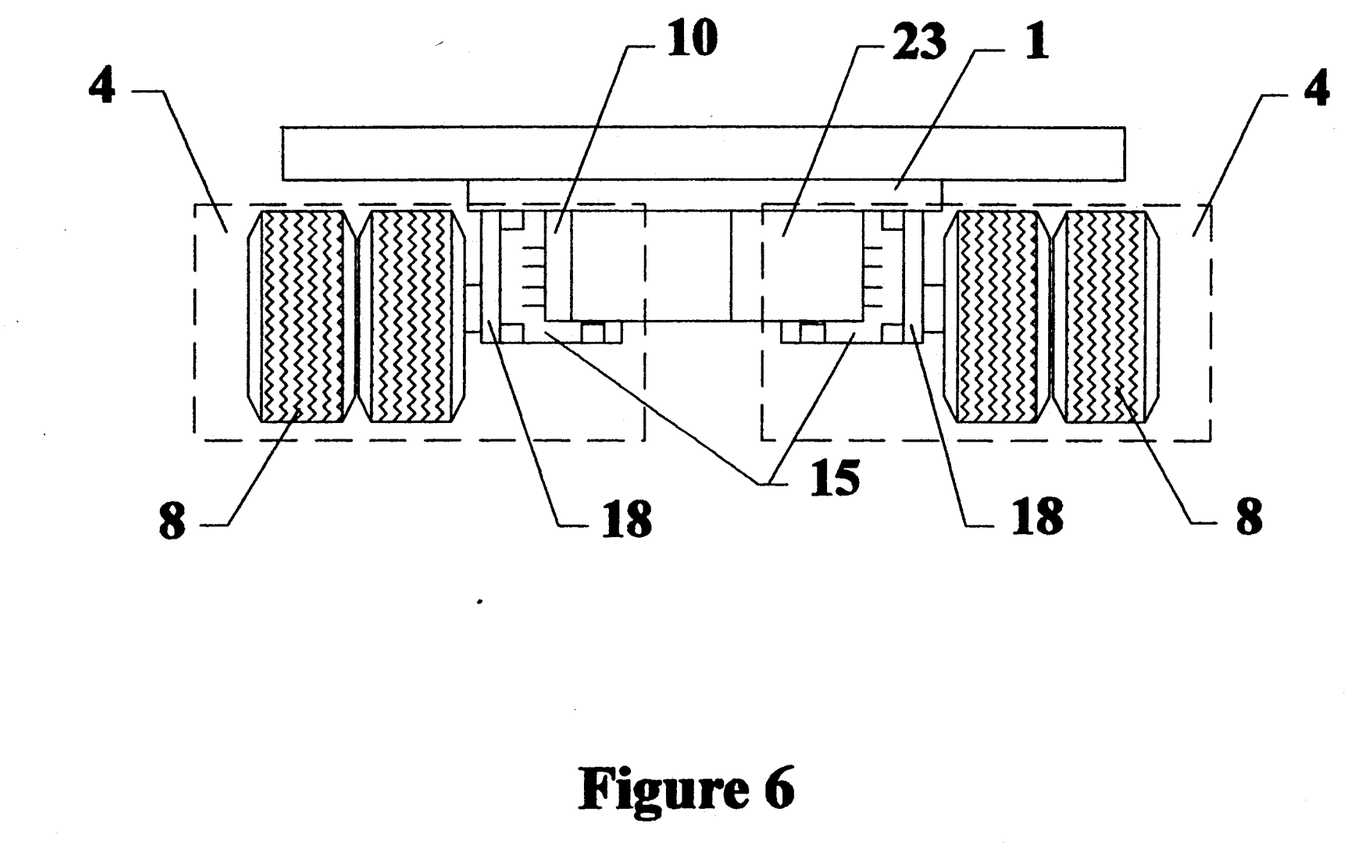
FIG. 6 illustrates the Control Electronics package and its location on the Trailer platform.
Figures 7A, 7B, 7C, 7D:
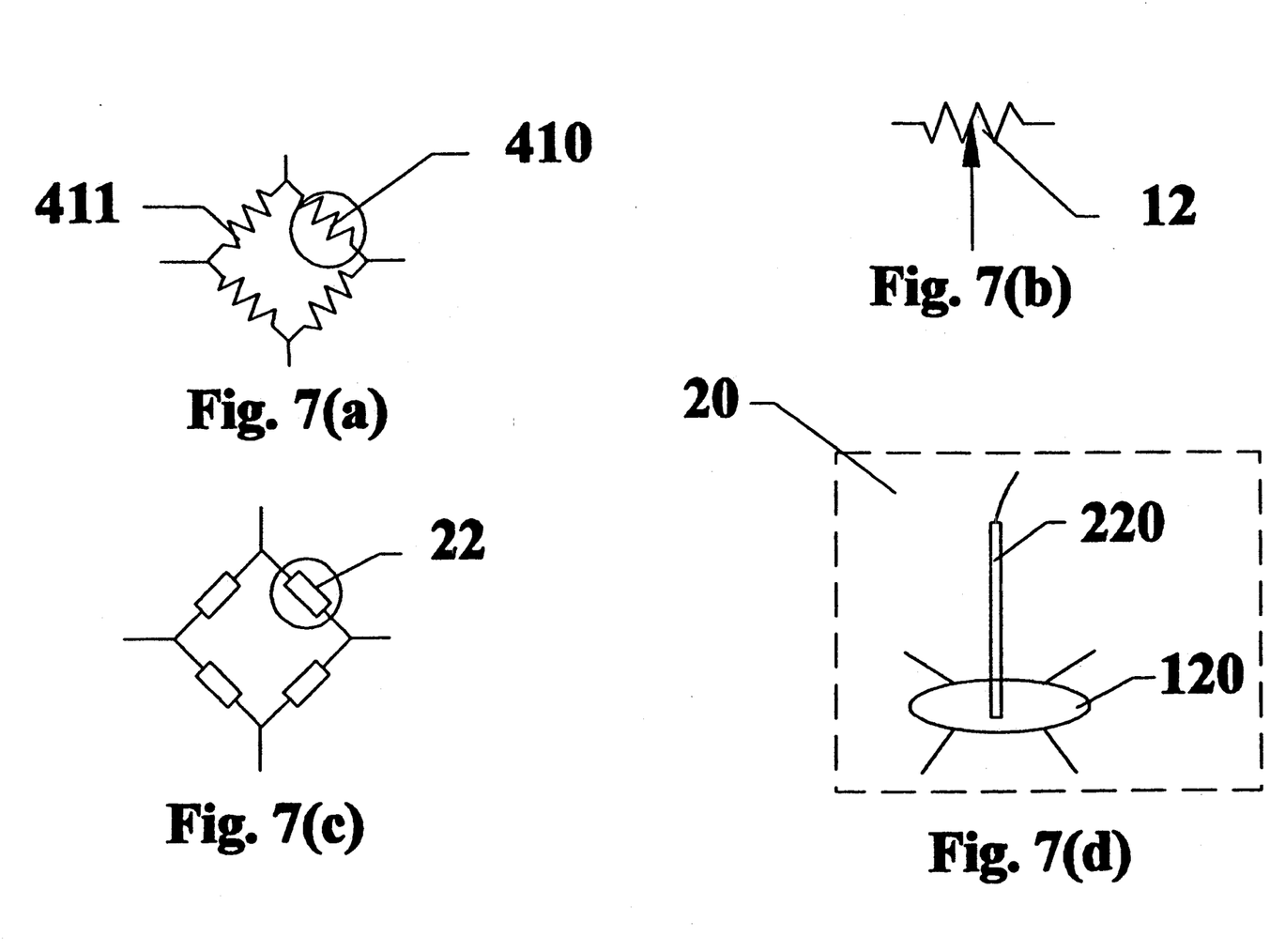
FIGS. 7(a), 7(b), 7(c) and 7(d) illustrate the typical system sensor electrical configurations.
Figure 8:
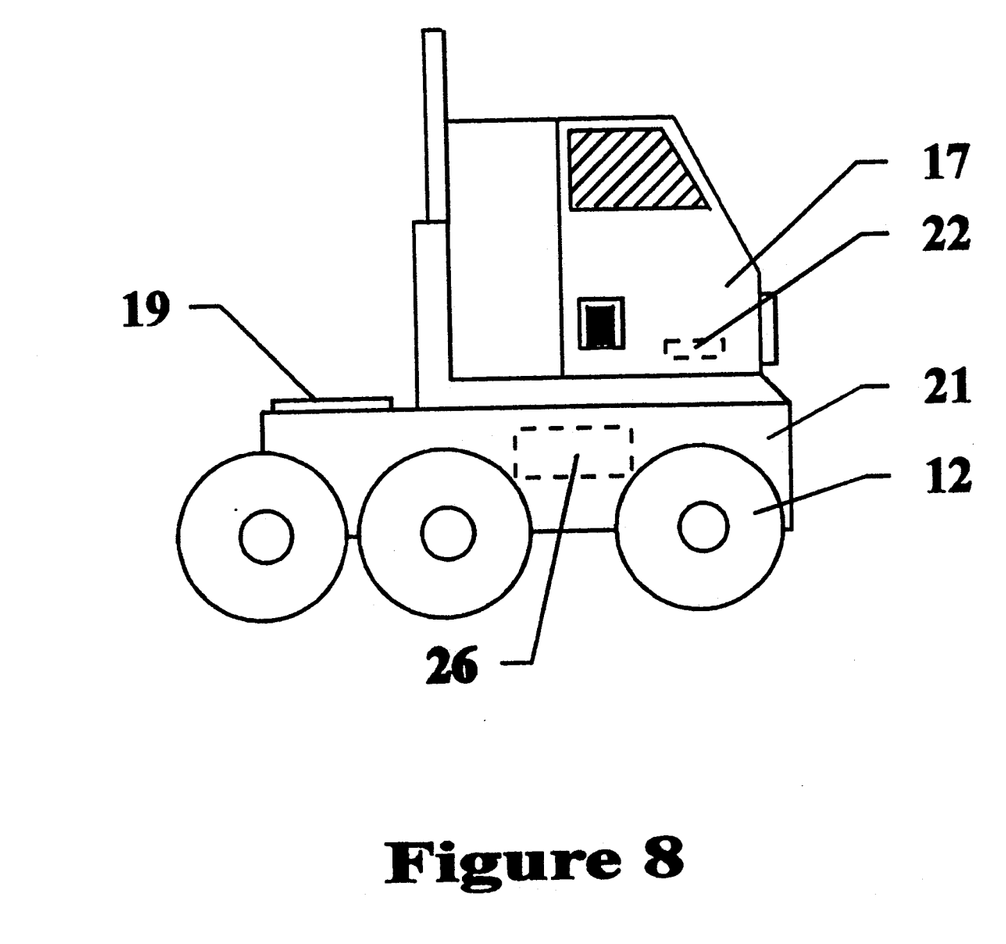
FIG. 8 shows the location of truck sensors used by the control system.

FIG. 1 illustrates the Truck/Trailer Control System as stated in the invention. The Microcontroller system 10 is located in the trailer rotational platform 1 and provides total control of the trailer operation. Trailer information 2 (in FIG. 2), from the Trailer Body 5, and the Truck Operational information 6, is used by the Microcontroller system 10 to determine the instantaneous operational situation and respond to any Truck movement or operation. Information received from the Truck cab 3 (in FIG. 8) is processed by the Microcontroller to establish the correct trailer movement in response to the Truck Operational information 6 (in FIG. 2). The Functional Block Diagram in FIG. 2 represents the total system. Truck operational information 6 is received by the Microcontroller and processed with the information received from the Trailer platform 1 and the Trailer body 5. The Platform turning Mechanical Drive Assembly 14 (in FIG. 4) is located on the Platform. This assembly contains a drive motor and a gear drive mechanism which receives a signal on line 214, from the power conversion electronics 16, which drives the Mechanical Drive Motor 14 to rotate the platform to the position determined by the Microcontroller electronics 10. A platform rotational position potentiometer 13 provides the Microcontroller 10 with a DC Voltage which represents Trailer Platform position which is received over signal line 113. All linear position potentiometers, pressure transducers, batteries and temperature sensors provide an analog DC voltage signal which is converted by the Analog to Digital (A/D) converter, in the Microcontroller device, to digital information which is processed by the Microcontroller. Another position potentiometer 12 is located in the Truck Cab 3 front wheel steering assembly, as illustrated in FIG. 2, provides a DC Voltage, which represents front wheel turning position information, and is transmitted over line 112 which is used by the Microcontroller to establish Trailer movement. A third position potentiometer 19 is located in the Truck/Trailer connection which provides a DC Voltage that represents the Truck/-Trailer angle and is transmitted over line 420. This device provides the rotational movement between the truck and trailer. The trailer tilt sensor 20 is located in the top rear of the trailer to obtain maximum tilt of the trailer. The tilt sensor 20 provides side-to-side tilt as well as uphill tilt information which is transmitted over line 120. The Tilt information is provided as an X-Y coordinate vector which provides the tilt and direction. The Tilt Sensor 20 operates as a transformer with the excitation of the primary on line 220 provided by the pendulum of the transformer and the four secondaries on lines 120 and 221 sense the change in amplitude as the pendulum moves toward the coil. The Trailer mechanical drive assembly 4 shown in FIG. 6 contains the Electro-Magnetic Braking/Motor 15 and the drive gear assembly 18. The Electro-Magnetic Assembly 15 is used for the Electro-Magnetic Brakes, the Generator for recharging the battery over lines 114, and the Motor drive on lines 214. The Electro-Magnetic Assembly, under Microcontroller control, is reconfigured electronically to a motor configuration which provides the power required to drive the assembly as a motor. The drive control 16 is a Pulse-Width controller, with an "H" bridge drive output, which provides a variable drive control signal 214 to the motor. The "H" bridge driver is similar to those manufactured by ThomsonCSF UAA4004, Sprague UDN-2952, UDN-2998W, Mitsubishi M54540 through M54548, AND Unitrode PIC900. This approach of applying power builds up the least amount of heat during operation. The principle, for the Pulse-Width control, is determined by the amount of power to be delivered to the motor or brake. The wider the pulse, the greater the energy transfer to the drive assembly. This same Pulse-Width control is used for the braking system. In the braking application, the amount of pressure applied to the truck brakes is sensed by the hydraulic/pneumatic brake pressure transducer, which provides a DC analog signal, and this sensed voltage is converted by the internal A/D converter in the Microcontroller to a digital signal which is then converted to an output Pulse-Width. This signal is transmitted to the motor field with the power reversed across the windings. By the use of power Field Effect Transistors (FETs) and the "H" bridge drive, the braking control uses the pulses generated by the Pulse-Width controller to provide reverse drive to the Electro-Magnetic assembly for the application of brakes. This reverses the connections to the motor and applies power in the opposite polarity thus providing the most effective braking power. All braking is controlled to keep the wheels from locking-up thereby becoming less effective. This approach also minimizes the power dissipation, because of the low saturation resistance of Power FETs, and will not require extensive heat sinking assemblies as has been necessary in prior applications. The Pulse-Width braking will allow the trailer to be brought to a complete stop using the same characteristics as used by the Truck. In emergency situations the Trailer will provide additional stopping power to the Truck/Trailer system as well as an additional safety factor, of controlled braking, not presently available. With the Trailer braking control system in operation the major problem of jackknifing during emergency situations will virtually be eliminated. Additional benefits derived from this system are;

1. Brake Shoe replacement is very rarely necessary. Backup brake shoes are installed as a parking brake or can be used as additional braking power in emergency situations or because of a power failure. The standard "JAKE" brakes will not be installed which eliminates the drag caused by these brakes mechanically rubbing against the brake drum. The mechanical parking brake is spring loaded to maintain adequate clearance form the rotating axle to eliminate any drag to the axle. This alone will improve the miles per gallon obtained.

2. Brake Inspection Stops are no longer required since there are no mechanical brakes used. This will provide the operator with additional travel time and lower operating and maintenance costs.

3. Minimizes wear of Trailer tires thereby providing additional savings in maintenance costs. Truck/Trailer turns will reduce wear on tires and during downhill excursions the Electro-Magnetic braking system will provide the most efficient braking without causing the wheels to lock-up as is presently done. Most wear problems are caused by burning up the tires when the wheels lock-up. In some cases the heat generated from brakes locking-up will also cause the caps from retreaded tires to separate and tear away from the tires, leaving debris all over the roads.

4. Additional Uphill Driving Power. The motor driver system will provide additional driving power to the Truck during uphill transitions.

5. Decreased Fuel Consumption. On long transitions the motor drive can be used as an additional power drive which will enhance gas mileage. This is accomplished by using one set of wheel assemblies 4 as generators and the other set as motor drivers. If the power conversion analysis of the system establishes a greater efficiency, with the use of the Pulse-Width drive engaged than the fuel driven engine, the Pulse-Width drive will be engaged to enhance fuel consumption. This analysis routine uses a mathematical model for the truck engine efficiency (provided by the manufacturer) and a mathematical model for the Electro-Magnetic motor efficiency, as well as the energy stored in the batteries, and combines the two models and battery information to derive the optimum combination of the two. One reason for efficiency increase, made available with this system, is due to the removal of the standard brake dragging which is always present since there are no longer any standard brakes on the trailer nor brake drums for anything to drag against. Another reason is due to the efficiency of Pulse-Width control being in the range of 90% efficient in driving the motor assemblies.

6. Increased Levels Of Safety. With this system in operation there is little danger of trailer damage or damage to other objects or vehicles. The trailer steering system prevents short turns from occurring and eliminates the danger of causing damage by trailers making short turns. The tilt sensing 20 prevents trailers from turning over on turns when turns are made to fast. This is accomplished by allowing the center of mass to change prior to turning the rear of the trailer. With the center of mass changing direction at a much slower rate the trailer tilt is minimized and the stability of the trailer maintained.

7. Dual Redundant System. Two control electronic units are included in the system. Both control electronic units are identical and operational at all times. The two control electronics continually monitor each other, through a parallel digital bus connected through a ribbon cable between the units, for any possible failures. The interconnections between units is very short because the units are mounted next to each other in the control electronics assembly. This provides maximum safety of operation at all times. Included with this feature is an override control switch located on the operator control panel 7 which turns off the steering control system and pins the turning platform to a straight forward position.

8. Automatic Braking on Trailer Disconnect. In the event that the trailer becomes disconnected from the truck, the trailer control system automatically signals the operator on the control panel 7 of the trailer disconnect and as the truck comes to a stop the trailer automatically controls the trailer braking to stop at the same rate as the truck. This is accomplished by detecting the separation of the connector which connects the Truck/Trailer position potentiometer 19 and using the brake hydraulic/pneumatic transducer signal lines 422. In the situation where the trailer is totally disconnected from the truck, the interconnection between the trailer and truck will disconnect and the system detects the disconnect and automatically brings the trailer to a controlled stop under the control of the system. In this situation the interconnect cable between the Truck and Trailer will have been disconnected. The power required for this operation is received from the batteries 23 included on the Trailer Platform.

9. Automatic Trailer Positioning Control. The Doppler transceiver is used for detecting distances to nearby objects near the sides and rear of the trailer. The transceiver will provide clearance information to allow the system to steer the trailer between objects while backing up to loading docks or in tight areas. The Doppler transceiver transmits an electronic pulse output signal which is reflected back to the receiver in the unit. The time, determined by the transceiver, between the time the signal was sent from the transmitter to the time the receiver detected the signal, determines the distance to the detected object. This is the clearance information on lines 109 which is used by the controller to steer the rear of the trailer into position.

10. Overhead Clearance Warning System. The Doppler system is used, in the same manner as illustrated above, to detect distance objects for overhead clearance. This system sends out an electronic pulse which is reflected off the surface of distant objects and the reflected signal from those objects is detected by the receiver in the doppler system. The time between transmission and receipt of the signal reflects the distance from the truck to the object. Triangulation of the reflected signals will be used to determine underpass or overpass clearances. This information on lines 109 is used by the control system to warn the operator of low overhead clearances to prevent damage to the top of the trailer. When the doppler system detects low clearances ahead of the truck the system will warn the operator that the clearance is not sufficient for the trailer to pass under. Many trailers have been damaged from low overhead clearances because the operator cannot see the top of the trailer while driving and, if there is no sign indicating the height of an overhead pass, a judgment call is made. Sometimes the overpass is not seen until it is to late.

11. Adaptability to Different Trailer Configurations. The system contains an interchangeability feature which allows any trailer configuration to be installed on any platform. This feature is a Key Code Interconnect installed in the interconnection connector between the trailer body 5 and the platform 1. A key code is assigned to each trailer configuration and, when the trailer platform is installed, the key code is accessed from the interconnection between the trailer bed and the platform. This provides trailer length information needed to configure the electronics to operate with the type of trailer body installed on the platform.

The Power Conversion Assembly 16 (illustrated in FIG. 4) is controlled by the Microcontroller electronics and provides the power drive signals on lines 214 to the Electro-Magnetic assembly. The Microcontroller configures the Electro-Magnetic Assemblies into Generator, Motor, or Brake configurations. On the open road, for eight wheel trailers, four wheels are configured as generators which provide power to recharge the batteries 23 with voltage, on lines 114, which is routed through the Power Conversion Assembly. The DC voltage from the batteries is monitored by the Microcontroller through the internal A/D converter and when the batteries are sufficiently charged the generator will be electrically disconnected and no charging will occur. When the Truck/Trailer is operating in a downhill transition all eight of the Electro-Magnetic assemblies 4 are configured as brakes. During a braking operation the power drive to the Electro-Magnetics is reversed in polarity and Pulse-Width drive signals on lines 214 are sent to the brake configuration, with pulse-widths varying as necessary to obtain maximum effective braking, as determined from the brake pressure applied by the operator. The harder the operator presses the brakes the greater the output signal on lines 422 from the pressure transducer 22, the wider the pulses become thereby applying increasing power to the brakes. The batteries 23 are utilized as sources of power to drive the Electro-Magnetics during uphill transitions when the Electro-Magnetic assemblies are configured as motors. In the motor configuration the Pulse-Width drive to the motors provides an effective aid to uphill excursions. The Microcontroller determines the Pulse-Width needed by calculating the most efficient combinational use of the truck engine and the motor drive to peak out the system efficiency. Truck Operational information 6, the truck speed from the magnetic pickoff 26, the transmission engaged gear information and the uphill tilt sensing information on lines 120 will determine the need for uphill assist. As the detected speed decreases, the operator changes gears and the tilt sensor indicates an uphill mode of operation, the system will respond by providing a pulse-width drive to the trailer wheels. The batteries 23 are monitored by the electronics to verify status and to keep them fully charged and from overcharging. When the batteries are totally charged the Electro-Magnetic assembly is configured to a motor, brake or standard configuration as required. In the standard configuration the brake dragging has been eliminated and this alone will improve the mileage per gallon in fuel consumption.

The Control System is configured in a Failsafe Dual Redundant configuration. Either of the two identical control electronics units can maintain total control of the Truck/Trailer System at any time. During normal operation when the Truck/Trailer speed exceeds a fixed speed (normally a speed which would be greater than the maximum allowable to make any turns) the Trailer platform is automatically locked into a fixed forward position and the platform will not be allowed to rotate. All other systems remain in normal operation. In addition to these safeguards an override control is provided to the operator in the Truck Cab 3 on the System Control Panel 7. Also on the control panel 7 are the power and operational controls for the Electronic System. Indicator lights are provided which let the operator know what the system is controlling. For instance, if the truck has increased its speed to greater than a safe turning speed a light will be turned ON indicating that the Trailer Platform 1 is locked in a fixed forward position for high speed operation. For future operations, after the system has proven its performance capability, the locking feature will only be engaged by the operator and, if not engaged by the operator, the turning control by the system will also be used during high speed turns to minimize swaying of the trailer during these turns. A power ON light is provided to let the operator know that there is power applied to the system and the system is operational. Another light indicates the status of the operating system. During Power-Up Initialization both Control Electronics conduct a self test on themselves and of each other to verify operational readiness. If one system is not functioning properly the fail indicator will be illuminated, indicating failure of one control system, while the remaining good system will operate normally. Also during system initialization the Microcontroller will conduct a survey of the system to establish what interconnections and sensors are connected. The manual control provided will allow the operator to override the turning control system and operate in the present fixed forward standard mode of operation. The Trailer Platform will lock into a fixed forward position and no rotation of the Trailer Platform will occur. This will mean that the operator will now have to allow adequate clearance for turning corners as well as other maneuvers. The Electro-Magnetic brakes and Motor Drive will remain in operation. All safety features provided by the system will reduce the problems that occur during normal operation as well as in emergency situations. With these beneficial features installed in the Truck/Trailer it is possible that insurance rates would become more favorable by possible reduction in costs. This may not occur immediately but after the system has been proven to increase truck safety it could become a reality.

For the system description as stated above it will be well understood, by those who use or are involved in the production of Truck/Trailer systems, that the inclusion of the McLaughlin Truck/Trailer Control System installed in their vehicle will benefit them by providing a reduction in operating costs, a much safer vehicle and give them the additional benefit of lower operational and maintenance costs. The overall operation will provide a less stressful operation with fewer headaches. To those, skilled in the control system aspects of this operation, this will provide a major step into a new future in trucking operations.

This invention provides only a relatively small number of possibilities. Additional features can be added, as innovative products are made available, with very little difficulty. As the semiconductor industry grows and manufacturing capabilities expand, so do the possibilities for improvements and additions. The system is equally applicable to the truck for braking and motor assist. A control system installed in the truck can provide the controls for the trailer as well thereby reducing costs.

My invention contains but is not limited to:

TRUCK

1. Front wheel steering monitoring.
2. Brake hydraulic/pneumatic pressure monitoring.
3. Battery monitoring.
4. Trailer disconnect monitoring.
5. Operator Interface/Control Panel.
6. Operator System Override Control.
7. Engine temperature monitoring.
8. Engine oil pressure monitoring.
9. Engine RPM monitoring.
10. Transmission speed sensing.
11. Transmission gear sensing.

TRAILER

1. Platform Steering Control system.
2. Platform rotating assembly.
3. Platform rotation position monitoring.
4. Electro-Magnetic Power Control and Interface system.
5. Electro-Magnetic Brake system.
6. Electro-Magnetic Motor/Generator Control system.
7. Electronic Pulse-Width Generator/Controller.
8. Battery Monitor system.
9. Trailer Disconnect monitoring.
10. Key code Truck/Trailer Interconnect.
11. Emergency Brake Backup system.
12. Pulse-Width Motor Drive system.
13. Microcontroller system control.
14. Platform Rotational Position Closed Loop Control system.
15. Doppler Sensing system—rearward movement centering control system.
16. Doppler Overpass Sensing system.
17. Dual Redundant Electronics Control system.
18. Automatic Brake Control system upon Trailer disconnect.
19. Electronic Power Drivers for wheel motor drive.
20. Pulse-Width Braking system.
21. Battery Recharging system.
22. Programmable system for multiple applications and system upgrading.
23. Platform Forward Position Locking Control system.
24. Corner Steering Control system.
25. Rearward Movement Steering Control system.
26. Trailer Tilt monitoring.

Undoubtedly, numerous variations and modifications of the invention will become readily apparent to those familiar with control systems and electronic design. Accordingly, the scope of the invention should not be construed as limited to this specific embodiment depicted and described, but rather as defined in the claims appended hereto.

I claim:

1. In a vehicle having a truck unit with an engine, and front truck wheels mounted for turning in unison to each side relative to straight forward alignment and a trailer unit joined to said truck unit in articulated fashion by a coupling therebetween, said trailer unit having a trailer body and at least a set of rear wheels mounted on a rear trailer wheel axle assembly the improvement comprising:

front truck wheel turning sensor means for sensing the extent of turning of said front truck wheels relative to straight forward alignment of said truck unit and for generating a front wheel turning position signal indicative thereof, truck travel speed sensing means for sensing the velocity of said truck unit and for generating a velocity signal indicative thereof, alignment sensing means located at said coupling between said truck unit and said trailer unit and providing a truck/trailer angle position signal indicative of degree and direction of angular offset of alignment of said trailer body relative to said truck unit, a trailer platform mounted beneath said trailer body for rotation relative thereto about a vertical platform axis and carrying said rear trailer wheel axle assembly, whereby said trailer platform and said rear wheel axle assembly are rotatable together relative to said trailer body about said vertical platform axis, reversible platform drive motor means for selectively driving said trailer platform in alternative directions about said vertical platform axis relative to straight forward alignment with respect to said trailer body, platform position sensor means for sensing the angular orientation position of said trailer platform relative to said trailer body and for providing a platform orientation feedback signal indicative thereof, tilt sensing means on said trailer body generating a tilt information signal indicative of lateral tilt of said trailer body, electronic trailer steering control means coupled to receive said front wheel turning position signal, said platform orientation feedback signal, said truck/trailer angle position signal, said tilt information signal, and said velocity signal and for providing a drive signal to said platform drive motor means to drive said platform to follow the turning of said front truck wheels at a delay interval dependent upon said velocity signal, the distance between said coupling and said front truck wheels, and the distance between said coupling and said vertical trailer axis.

2. A vehicle according to claim 1 further comprising a manually operable override control coupled to said electronic trailer steering control means whereby actuation of said manually operable override control operates said electronic trailer steering control means to drive said platform to straight fore and aft alignment with respect to said trailer body and to thereafter disable said electronic trailer steering control means.

3. A vehicle according to claim 1 wherein said drive signal is additionally dependent upon said tilt information signal.

4. A vehicle according to claim 1 further comprising a Doppler transceiver means located on said trailer body and coupled to said electronic trailer steering control means to provide an obstacle clearance signal, whereby said drive signal to said platform drive motor means is additionally dependent upon said obstacle clearance signal.

5. A vehicle according to claim 4 wherein said Doppler transceiver means is comprised of Doppler transceivers located at the upper front of said body, at the lower rear of said body, and on opposite sides of said body proximate the lower rear extremity thereof.

6. A vehicle according to claim 1 wherein said electronic trailer steering control means is a programmable Microcontroller having sets of dimensional parameters for a plurality of different truck and trailer configurations stored therein, and further comprising selection means for alternatively selecting each of said sets so that said distance between said coupling and said front truck wheels and said distance between said coupling and said vertical trailer axis is derived from the set of dimensional parameters selected by said selection means.

7. A vehicle according to claim 1 wherein said electronic trailer steering control means is comprised of electronic storage means for storing a maximum turning velocity, and a maximum turning velocity limiting means which receives and compares said velocity signal to said maximum turning velocity, and wherein a velocity signal that exceeds said maximum turning velocity activates said electronic trailer steering control means to drive said platform into and hold said platform in straight fore and aft alignment relative to said trailer body.

8. A vehicle according to claim 1 further comprising dual, redundant electronic control units within said electronic trailer steering control means, and said dual control units continuously monitor each other for inconsistencies, and further comprising an operator alarm located in said truck unit and coupled to said electronic trailer steering control means which is actuated by inconsistencies in operation of said dual control units.

9. In a vehicle having a truck with an engine with a tachometer coupled thereto to generate an engine speed signal and a body having a rear wheel axle with rear wheels thereon and transmission means through which said engine drives said rear wheel axle in rotation, the improvement comprising a magnetic motor assembly means including rotor means coupled to rotate with said rear wheel axle and stator means disposed about and stationary relative to said rotor means, tilt sensing means on said body generating a tilt information signal indicative of fore and aft angular orientation of said body, and electronic drive control means coupled to receive said tilt information signal and said engine speed signal to energize said stator means to selectively and alternatively operate said magnetic motor assembly means as a magnetic motor assisting said transmission means in rotating said rear wheel axle and as a magnetic brake opposing said transmission means and retarding rotation of said rear wheel axle to an extent dependent upon said engine speed signal and said fore and aft orientation signal.

10. A vehicle according to claim 9 wherein said electronic drive control means energizes said stator means with a variable Pulse-Width power output.

11. A vehicle according to claim 10 further characterized in that said truck has a manually operated brake pedal, and further comprising a transducer coupled between said manually operated brake pedal and said electronic drive control means for generating an electronic brake signal indicative of the magnitude of pressure applied to said manually operable brake pedal, and the width of said variable pulse of said power output to said magnetic motor assembly means is varied in accordance with said electronic brake signal when said magnetic motor assembly means is operated as a magnetic brake.

12. A vehicle according to claim 9 wherein said tilt sensing means is located at the top rear of said trailer body.

13. A vehicle according to claim 9 further comprising battery means to power said magnetic motor assembly means with direct current electrical power, and said magnetic motor assembly means is coupled to said battery means so as to serve as a generator to recharge said battery means while acting as a magnetic brake as aforesaid.

14. A vehicle according to claim 13 wherein said rear wheel axle assembly is comprised of a plurality of rear wheel axles each having a separate magnetic motor assembly means associated therewith, and further comprising a power conversion assembly coupled between said electronic drive control means and all of said magnetic motor assembly means, whereby said magnetic motor assembly means are selectively operated under the control of said electronic drive control means alternatively as magnetic motors, magnetic brakes and generators.

15. A vehicle according to claim 9 wherein said body is mounted on a trailer joined to said truck in articulated fashion by a coupling therebetween, and further comprising an alignment sensing means located at said coupling between said truck and said trailer and providing a truck/trailer angle position signal indicative of degree and direction of angular offset of alignment of said body relative to said truck, and further characterized in that said electronic drive control means is located on said trailer platform and further comprising battery means located on said platform and said electronic drive control means is conditioned to energize said stator means to operate said magnetic motor assembly as a brake so as to bring said trailer to a controlled stop upon loss of said truck/trailer angle position signal.

16. A vehicle according to claim 9 further comprising dual, redundant electronic control units as aforesaid within said electronic drive control means, wherein each of said dual, redundant electronic control units receives said tilt information signal and said engine speed signal to energize said stator means as aforesaid, and said dual control units are also coupled to each other and continuously monitor each other for inconsistencies, and further comprising an operator alarm located in said truck unit and coupled to said electronic drive control means which is actuated by inconsistencies in operation of said dual control units.

* * * * *